June 18, 1935. W. KARSEL ET AL 2,004,993
AUTOMOBILE HEATER
Filed Oct. 28, 1931 6 Sheets-Sheet 2

Inventors:
William Karsel,
Charles W. Taylor;
By attys.

June 18, 1935. W. KARSEL ET AL 2,004,993
AUTOMOBILE HEATER
Filed Oct. 28, 1931  6 Sheets-Sheet 3

Inventors:
William Karsel,
Charles W. Taylor,

June 18, 1935.　　W. KARSEL ET AL　　2,004,993
AUTOMOBILE HEATER
Filed Oct. 28, 1931　　6 Sheets-Sheet 4

June 18, 1935.  W. KARSEL ET AL  2,004,993
AUTOMOBILE HEATER
Filed Oct. 28, 1931   6 Sheets-Sheet 6

Inventors:
William Karsel,
Charles W. Taylor,

Patented June 18, 1935

2,004,993

UNITED STATES PATENT OFFICE 2,004,993

AUTOMOBILE HEATER

William Karsel, Chicago, Ill., and Charles W. Taylor, St. Louis, Mo.; said Taylor assignor to said Karsel Application October 28, 1931, Serial No. 571,588

18 Claims. (Cl. 257—241)

The object of the present invention is to provide novel means for heating automobiles by the use of steam generated by the motor of the vehicle and utilized at the heater in a manner to supply steady and uniform temperatures within the space to be warmed.

The disadvantages of heating direct by the exhaust gases from automobile motors are well recognized. If permitted to escape into the body of the vehicle the gases are dangerous to life and health. Furthermore, by such heating the temperatures fluctuate to such an extent as to give unreliable results, and the temperatures attained by these heaters usually are either too high or too low. It is difficult to maintain even, uniform temperatures with these heaters.

Resort has been had to hot water heaters. While avoiding the extremes of temperature characteristic of the use of exhaust gas heaters, hot water heaters of the type commonly employed depend upon the water of the cooling system of the motors for their heating, and necessitate changes and modification of these systems in order to utilize the hot water thereof. Moreover, they are slow to generate the required heat initially, being dependent on the heating of the motor to give the necessary rise in temperature of the cooling water before the latter will yield the requisite temperature for heating the automobile.

The present invention seeks to provide a heater which will obviate the objections herein set forth. It contemplates an organization of elements of simple arrangement utilizing steam as the heating medium, and constructed and related in such manner that the steam is generated substantially instantaneously with the start of the motor and continues in uniform and steady supply to the heating element so long as the motor continues to operate.

Furthermore, the invention aims to provide a heater of the character mentioned that may be easily and expeditiously incorporated in an automobile without material modification of the structural features of the latter, and which, when so incorporated, may be maintained in operative condition without the attention of skilled workmen or difficult mechanical operations.

Other objects and advantages will appear as the nature of the improvements is better understood, the invention consisting substantially in the novel construction, combination and arrangement of parts hereinafter fully described, illustrated in the accompanying drawings, and finally pointed out in the appended claims.

The forms of the invention herein set forth present practical embodiments of the same, but the invention is not limited to such embodiments, being susceptible to change, modification and variation. The delineation of the invention, therefore, made the basis of the present disclosure is to be considered only from an illustrative standpoint and not as imposing limitation or restriction upon the same.

Figure 1:
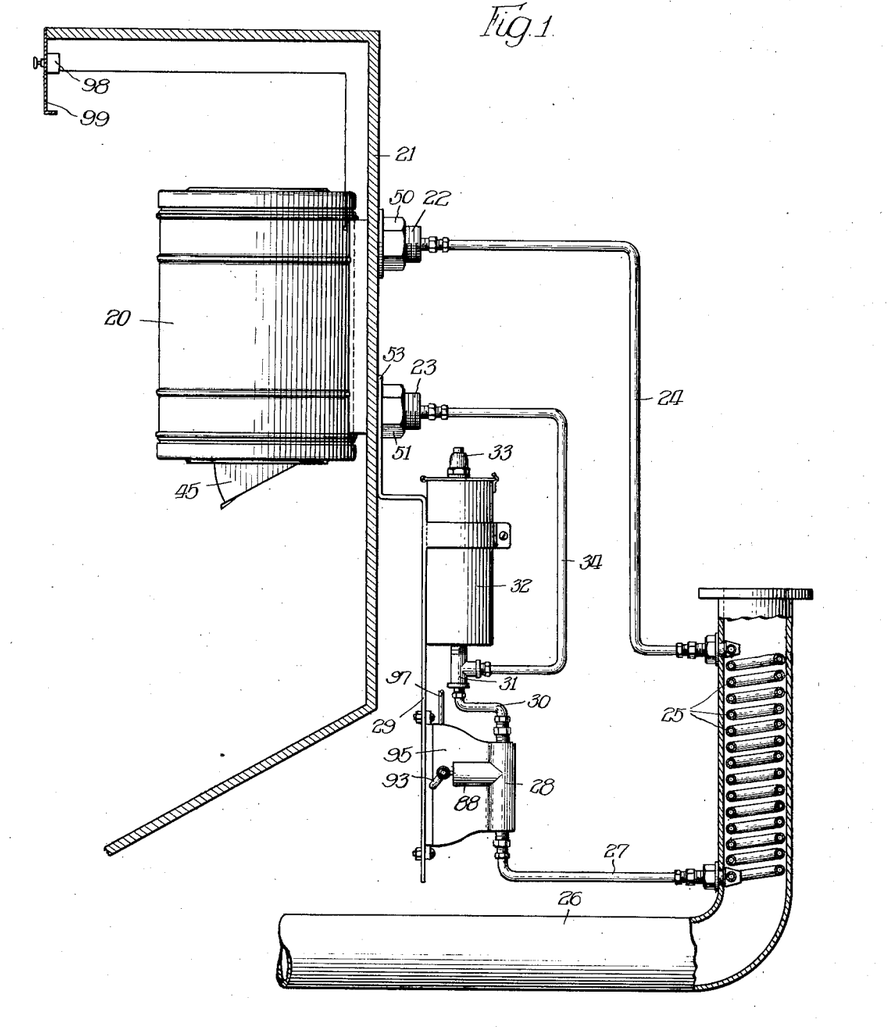
Fig. 1 is a side elevation, somewhat in diagram, of an automobile heater constructed in accordance with the present invention, a portion thereof being shown in section.

Having reference more particularly to that form of the invention illustrated in Figs. 1 to 6, inclusive, and more especially to Fig. 1, the numeral 20 designates the heater proper. It is suitably mounted on the dashboard 21 of an automobile, and positioned at one side thereof so as to lie within the space of the automobile body that is to be heated. The heater proper is provided with an inlet nipple 22 and an outlet nipple 23, which nipples afford the means for anchoring the heater proper to the dashboard 21, as will more fully appear at a later point herein.

Connected to the nipple 22 is a feed pipe 24 that leads to one end of a generating coil 25 that is mounted within the exhaust pipe 26 connected to the motor of the automobile for conveying the exhaust gases from the motor. It is not material to the present invention what the form of the exhaust pipe 26 may be, or at what point therein the generating coil 25 is positioned. It is preferable, however, that the coil shall be placed in the pipe 26 as near to the motor as possible in order to utilize the greatest heat of the gases as they are discharged from the motor. The coil 25 constitutes a steam generator, and water fed to this coil, as will be presently explained more in detail, is vaporized by the heat of the exhaust gases substantially instantaneously, and flashes into steam to be conducted by the pipe 24 to the heater proper 20. It is well understood that the exhaust gases from the usual explosive motor employed with automobiles are of very high temperatures, and by reason of this fact the steam, after being initially generated and passing to the exhaust end of the coil 25, will be superheated, so that the steam will be of high temperature when it leaves the generating coil and is conveyed to the heater 20. Obviously, due to this condition of the steam, a relatively small volume thereof will be required to impart to the heater 20 the required temperature for raising the temperature of the air in the automobile body.

Connected to the end of the generating coil 25 opposite to that to which the pipe 24 is connected is a feed-water pipe 27. This pipe 27 leads from the discharge end of a water pump 28 that is supported in suitable relation to the generating coil 25 and the exhaust pipe 26, illustrated, for instance, as by hanger 29 mounted on the dashboard 21. To the inlet end of the pump 28 is connected a pipe 30, said pipe 30 also being connected to a T 31 mounted at the lower end of a water supply tank 32 that is supported by the hanger 29. The T 31 permits water to feed from the tank 32 to the pump 28. Any form of tank 32 may be employed, and said tank is provided with a pressure relief valve 33.

Leading from the T 31 to the outlet nipple 23 of the heater 20 is a discharge pipe 34 so that the water of condensation forming in the heater 20 may pass from the latter to the T 31 and be introduced into the line of circulation so as to be fed by the pump 28 back to the generating coil 25.

Figure 2:
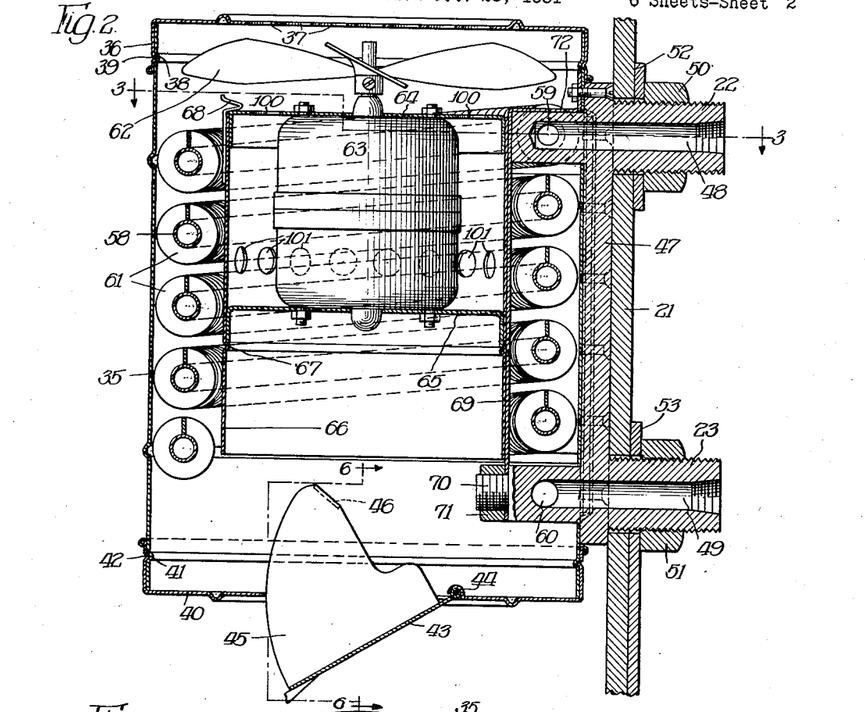
Fig. 2 is a vertical transverse sectional view of the heater proper, illustrated on an enlarged scale to that disclosed in Fig. 1, the line of section being indicated as 2—2, Fig. 3.
Figure 3:
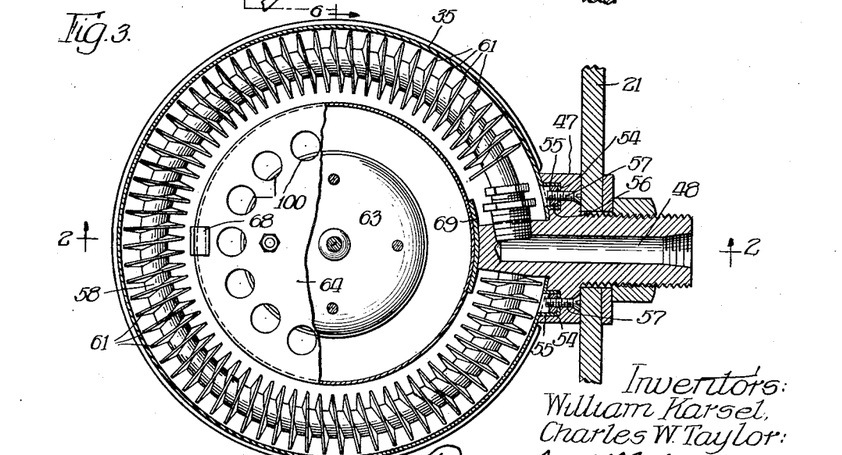
Fig. 3 is a sectional plan view of the heater taken on the line 3—3, Fig. 2.

The construction of the heater proper 20 is shown in detail in Figs. 2 and 3. It includes a cylindrical casing or shell 35 which is open at its top and bottom ends. This casing or shell is formed of metal and is closed at its top by a flanged upper cap 36. This cap is provided with a series of perforations 37 for the purpose of admitting air to the interior of the casing or shell. The cap 36 is held in place by frictional engagement with the casing or shell, the latter being provided with a peripheral groove 38 that receives a series of equi-distantly spaced indentations 39 formed in the flange of the cap 36, and thereby providing a locking engagement between the cap and the casing or shell.

The lower end of the casing or shell 35 is closed by a lower cap 40 having a flange that surrounds the former. The casing or shell has a peripheral groove 41 which receives a series of equi-distantly spaced indentations 42 formed in the flange of the cap, and thus the lower cap is locked into engagement with the lower end of the casing or shell.

Figure 6:
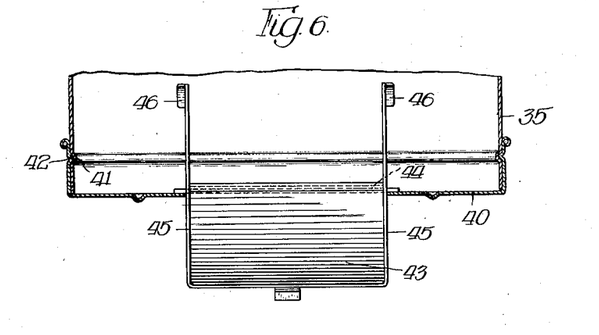
Fig. 6 is a cross-sectional view of the lower end of the heater, taken on the line 6—6, Fig. 2.

The lower cap 40 is provided with a centrally disposed opening controlled by a deflector plate 43 which is hinged at one of its edges, as at 44, to one edge of the opening of the cap. This deflector is also provided with guide wings 45 at its opposite sides which extend through the opening in the cap 40, the inner edges of the wings 45 having oppositely extending limiting stops 46 that engage the edges of the opening of the cap 40, and thereby limit the outward movement of the deflector plate 43 when the same is swung away from the cap 40. The deflector plate 43 serves to direct the discharge of the heated air from the lower end of the casing or shell 35 into the space of the automobile body that is to be heated, and in accordance with the degree of opening of the plate 43 with respect to the cap 40 will be determined the volume of air that is discharged from the heater into that space.

The nipples 22 and 23 form part of an elongated casting 47 of such length as to provide a substantial support for the heater 20, the outer face of the casting 47 being substantially flat so as to fit against the dashboard 21, or other support to which the casting 47 may be fitted. The inlet nipple 22 is located at the upper end of the casting 47, while the outlet nipple 23 is located at the lower end of said casting, and said nipples are formed with longitudinal bores or passages 48 and 49, respectively. Both of the nipples 22 and 23 are received by openings formed in the dashboard 21, through which openings said nipples project to a substantial degree, and said nipples are screw-threaded at their exterior for receiving fastening nuts 50 and 51, respectively, in order to anchor and hold the nipples 22 and 23 within the openings of the dashboard. Suitable washers 52 and 53 are interposed between the fastening nuts 50 and 51 and the dashboard.

The supporting casting 47 is provided with a pair of vertically disposed grooves 54, one of which is located adjacent to each of the inner edges of the casting. These grooves receive vertically disposed fastening lugs 55, one of which is arranged at each marginal edge of the casing or shell 35. The fastening lugs 55 are substantially U-shaped in cross-section so as to conform to the contour of the grooves 54, said lugs 55 receiving a series of nuts 56 engaged by a series of fastening screws 57 which pass through the supporting casting 47, whereby the fastening lugs 55 are held in engagement with the supporting casting 47 and affixed thereto. The construction just described effectually holds the casing or shell 35 to the casting 47.

Arranged within the casing or shell 35 is a spiral heating coil 58, the convolutions of which extend throughout the major portion of the length of the casing or shell, and the ends of said heating coil 58 are connected to the inner ends of the bores 48 and 49 of the nipples 22 and 23. For this purpose the bores 48 and 49 are provided with lateral ports 59 and 60 to which the terminals of the heating coil 58 are suitably attached. Throughout the length of the coil 58 the same is provided with a plurality of radiating fins 61 so as to give greater radiating surface to the coil 58 for heating the air as it passes through the casing or shell 35.

For circulating the air through the casing or shell 35 a fan 62 is employed. This fan is carried by the armature shaft of an electric motor 63, which motor, in turn, is provided with supporting caps 64 and 65 bolted, respectively, to the upper and lower ends of the motor casing. The caps 64 and 65 are provided with flanges so as to engage the inner sides of a supporting shell 66 of less diameter than the shell 35, and mounted within the latter so as to be spaced therefrom and to be surrounded by the heating coil 58. The supporting shell 66 has an inwardly extending peripheral bead 67, said bead affording a support on which the flange of the cap 65 rests. The motor 63 thus is supported in proper position within the shell 66, and the flanged caps 64 and 65 hold the motor 63 against lateral movement within the shell 66. Inasmuch as the flanges of the caps 64 and 65 have frictional engagement only with the shell 66, the motor and the fan readily may be withdrawn from the shell 66 if occasion arises for the same. A spring fastening clip 68, carried by one side of the shell 66, engages the upper cap 64 and prevents displacement of the cap 64 from the shell until sufficient pressure is applied to overcome the resistance of the clip 68.

In order to support the shell 66 within the shell 35 an attaching member 69 is suitably fastened to the shell 66, the lower end of said fastening member 69 being mounted on a reduced neck 70 formed at the inner end of the outlet nipple 23 and held on said neck by a fastening nut 71. The upper end of the fastening member 69 has an L-shaped head 72, which head is bolted, as at 73, to the upper end of the casting 47.

Figure 4:
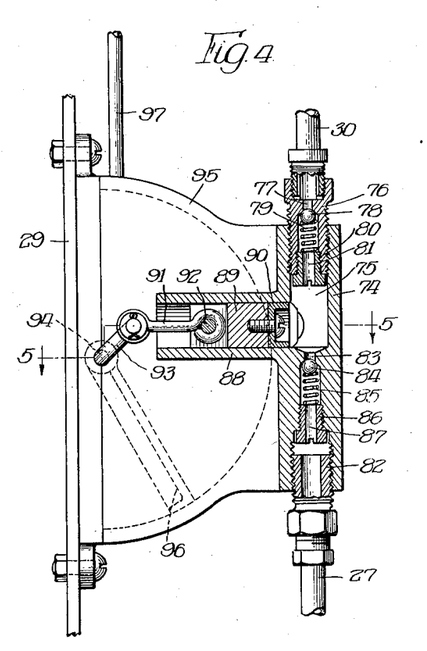
Fig. 4 is an enlarged elevation of the water pump employed for feeding the water to the steam generator, parts being shown in section.
Figure 5:
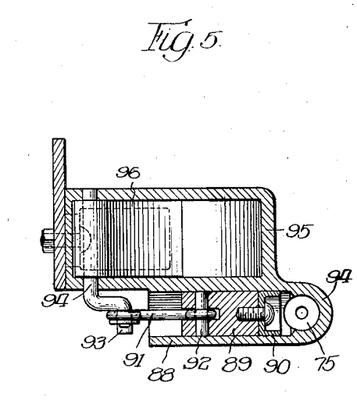
Fig. 5 is a sectional plan view of the pump illustrated in Fig. 4, taken on the line 5—5, Fig. 4.

In Figs. 4 and 5 is illustrated the construction of the feed-water pump and the means by which the same is operated. The pump includes an elongated barrel 74 having a water chamber 75 at its interior. The inlet end of the barrel 74 is internally screw-threaded to receive a screw-threaded nipple 76 to the outer end of which the pipe 30 is connected. The nipple 76 has a port 77 controlled by a ball valve 78 held to its seat against the inner end of the port 77 by a coil spring 79 the inner end of which seats against a holding plug 80 having screw-threaded engagement with the inner end of the nipple 76. The plug 80 is provided with a longitudinal port 81 by which communication is established between the water chamber 75 and the pipe 30.

The outlet end of the barrel 74 is internally screw-threaded and receives a coupling nipple 82 by which the feed water pipe 27 is connected to the pump. Communicating with the discharge end of the barrel 74 is a port 83 that leads from the water chamber 75, said port being controlled by a ball valve 84 held to its seat by a coil spring 85, which spring is seated against a holding plug 86 which has screw-threaded engagement with a reduced portion of the bore of the discharge end of the barrel 74. The plug 86 has a longitudinal port 87 which affords communication between the port 83 and the feed water pipe 27 when the valve 84 is unseated.

Extending laterally from one side of the barrel 74 is a cylinder 88 having communication with the water chamber 75. This cylinder receives at its inner end a piston 89 which is slidably mounted therein, the inner end of said piston having a packing washer 90 suitably secured thereto, and said piston 89 has a link 91, which is hinged to the piston 89, as at 92, the link 91 imparting to the piston 89 proper reciprocatory movement induced by a crank arm 93 carried by a rock shaft 94. The shaft 94 extends through the sides of an arcuate chamber 95 in which is disposed an operating piston 96, in the form of a plate, and connected to said chamber 95 is a pipe 97 which, in turn, may be connected to the inlet manifold of the automobile motor, or to some other suitable mechanism, for inducing suction within the pipe 97 in order to swing the piston 96 back and forth and thereby rock the shaft 94 back and forth to give the necessary reciprocation to the piston 89. On the outstroke of the piston 89 suction is created in the water chamber 75 to unseat the valve 78, and thereby permit a predetermined quantity of water to be drawn into the chamber 75. When the instroke of the piston 89 occurs the valve 78 is seated, and the pressure of the water created by such instroke unseats the valve 84, and the water passes out through the port 83 and is discharged through the outlet end of the barrel 74 into the pipe 27 to be conveyed by the latter to the inlet end of the generating coil 25 where it is converted into steam.

The chamber 95 and its piston 96 constitute a fluid pressure motor for operating the piston 89 of the pump, but any other suitable actuating means may be substituted for this type of motor adapted to give the pump periodical or pulsating operation so as to feed to the steam generating coil 25 the necessary amount of water, and in such quantities, as to enable quick generation of the steam for use in the heater.

No electrical circuit connections are disclosed for controlling operation of the motor 63. Any suitable connections for this purpose may be employed. A switch 98, however, may be placed upon the instrument board 99 of the automobile, or at any other suitable point, whereby the motor 63 may be started and stopped when it is desired to effect circulation of the air through the heater by operation of the fan 68.

In the use of the heater as illustrated in Figs. 1 to 6, the tank 32 is filled to the desired extent with the necessary quantity of water. When the motor of the automobile begins to operate the suction in the intake manifold will create suction in the pipe 97, thereby setting into operation the piston 96, and the motion of the latter is transmitted through the crank 93, operated by the rock shaft 94, and the link 91, to the piston 89. The movement of the piston 89, therefore, forces the water, which is drawn from the tank 32 into the chamber 75, through the port 83 and into the pipe 27, whence it is conveyed to the generating coil 25, and there is flashed into steam, due to the heating of the coil by the high-temperature exhaust gases from the automobile motor. The pressure of the steam causes it to pass through the pipe 24 to the inlet nipple 22 of the heater, and into and through the heating coil 58. The latter, equipped with the radiating fins 61, raises the temperature of the air within the casing or shell 35. When the motor 63 is energized the fan 68 is set in operation, and this draws air through the perforations or openings 37 of the upper closure 36, forcing the air downwardly over the heating coil 58 and out through the opening of the lower closure 40 which is controlled by the deflector plate 43. The angle of the discharge of the air at the lower end of the heater is controlled by the deflector plate 43, as well as the volume so discharged, this being regulated by the degree of opening of the plate 43.

In the operation of the fan a portion of the air drawn through the openings 37 is forced through a plurality of openings 100 formed in the cap 64 carried by the motor 63, which air passes over the motor and serves to cool the same. This air then passes out through a series of openings 101 formed in the sides of the shell 66, and is discharged with the other air through the lower end of the casing or shell 35.

Water of condensation will flow from the heating coil 58 through the outlet nipple 23 and the discharge pipe 34 to the nipple 31 from which it will enter the pump 28 to be again converted into steam at the generating coil 25.

Figure 7:
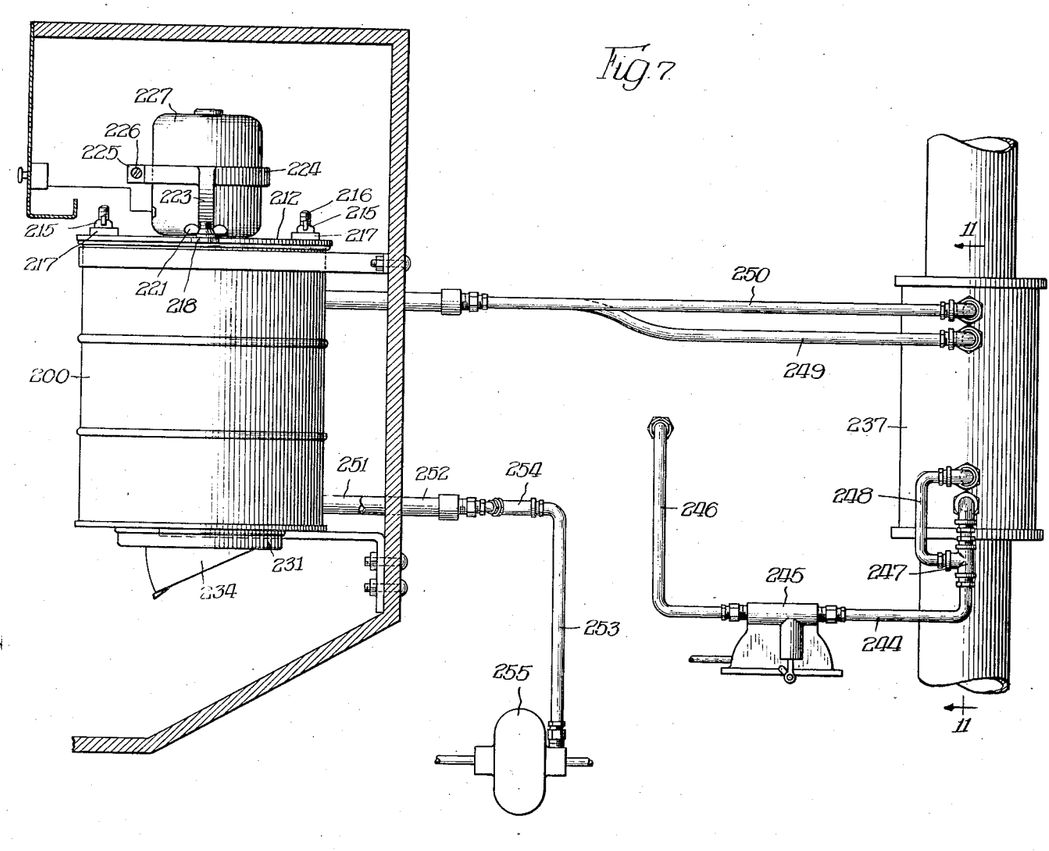
Fig. 7 is a side elevation, somewhat in diagram, of another form of the herein described heater designed for greater capacity and for employment for the heating of larger automobile bodies than those for which the form illustrated in Figs. 1 to 6 is designed.
Figure 8:
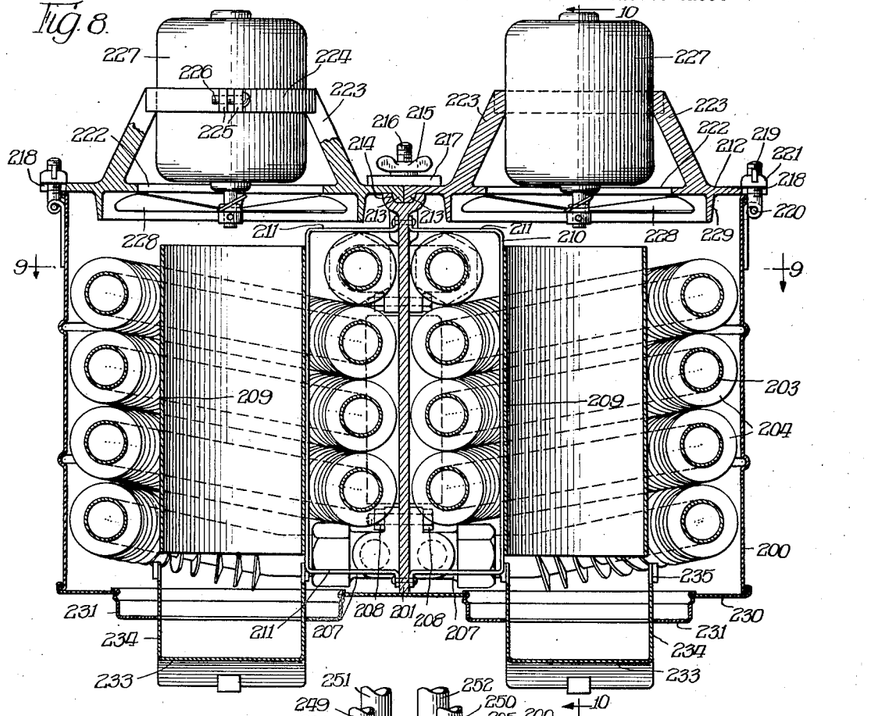
Fig. 8 is a vertical transverse sectional view of the heater employed with the form illustrated in Fig. 7, the line of section being indicated as 8—8, Fig. 9.
Figure 9:
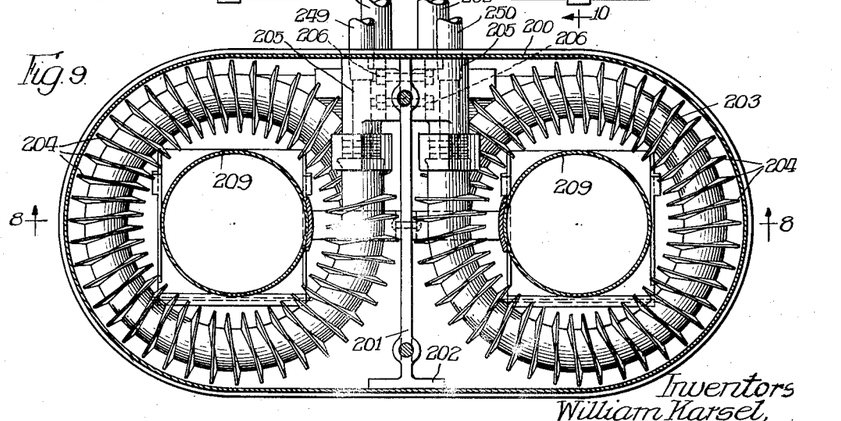
Fig. 9 is a sectional plan view taken on the line 9—9, Fig. 8.
Figure 10:
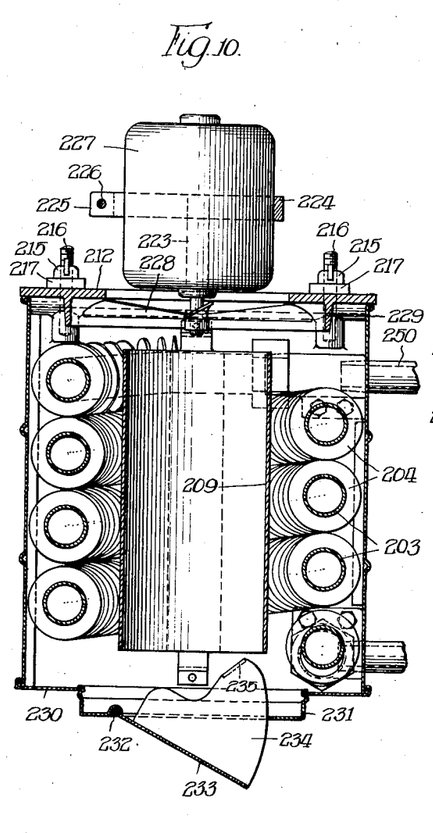
Fig. 10 is a sectional view on the line 10—10, Fig. 8.

In Figs. 7 to 11 inclusive, is disclosed another form of the invention which adapts the same to more extended application. While the form shown in Figs. 1 to 6 is sufficient to heat the interior of the body of an ordinary passenger-carrying automobile, the heating of the interior of passenger-carrying buses and similar conveyances requires a construction by which may be accomplished the circulation of heated air in greater volume. This requires also provision for the generation of steam in larger volume to adapt the heater for this purpose. To the attainment of this extended application of the invention the latter contemplates the use of a multiple heater, together with a steam generator which is so constructed as to provide the requisite volume of steam for the several units of the heater. In Figs. 8, 9 and 10 is shown a heater of the multiple type referred to. It includes a casing or shell 200 across the mid-portion of which is located a supporting partition 201 having enlarged heads 202 at its ends to which the casing or shell 200 may be suitably attached. The partition 201 divides the casing or shell 200 into separate compartments. In each of these compartments is located a spiral heating coil 203 the convolutions of which occupy the major portion of the space between the upper and lower edges of the casing or shell. Each of the coils 203 has a series of radiating fins 204 in order to impart greater radiating surface to the coils.

Adjacent to the upper edge of the partition 201, and located at opposite faces thereof, is a pair of inlet nipples 205, said nipples being bolted to the partition 201, as at 206. Adjacent to the lower edge of the partition 201, and also located at opposite faces thereof, is a pair of outlet nipples 207, said nipples being arranged in proximity to the lower edge of the casing or shell 200, and the same are bolted to said partition 201, as at 208. The upper end of each of the coils 203 is connected to one of the inlet nipples 205, while the lower end of each of said coils is also connected to one of the outlet nipples 207.

Within each of the chambers of the heater, and disposed preferably at the central portion thereof, is an inner shell 209, each of which is surrounded by one of the heating coils 203. Each of these shells 209 is suitably fastened to a supporting strap 210 having at its upper and lower ends horizontal attaching arms 211 suitably connected to the partition 201.

Over each of the chambers formed at the sides of the partition 201 is a closure head 212, each of said heads, at its edge adjacent to the other head, being formed with a depending flange 213. These flanges 213 are received by a transversely extending recessed head 214 arranged at the top of the partition 201, the meeting edges of the closures 212 being held in said grooved head by winged nuts 215 each of which engages an upwardly extending screw 216 supported by the partition 201. The screws 216 project upwardly through the meeting edges of the closures 212, and said meeting edges are spanned by washers 217 that are positioned between the nuts 215 and the closures 212.

The edges of the closures 212 opposite to those at which the flanges 213 are formed are recessed, as at 218, each of said recesses receiving a screw 219 that is hinged, as at 220, to the side of the casing or shell 200 so as to be swung into and out of the recess 218. Each of the screws 219 carries a winged nut 221 to be tightened against the closure 212 with which it is associated, and thereby to lock the closure in engagement with the shell or casing 200 so as to cooperate with the screws 216 and their nuts 215 in holding the closures 212 on the casing 200.

Each closure 212 has a centrally disposed opening 222 formed therein, a supporting yoke 223 rising above the opening 222 and including a compressible annular holding band 224 split at one of its sides to provide a pair of fastening lugs 225 in which is fitted a fastening screw 226. The holding band 224 encloses the casing of an electric motor 227, adjustment of the fastening screw 226 and the lugs 225 serving to clamp the band 224 in tight engagement with the motor 227 so as to support the same in the yoke 223. By the means just described each of the motors 227 is held in supported relation over the heating coil 203 of the unit with which the motor is associated. The armature shaft of each motor has a fan 228 mounted thereon, the fan being positioned beneath the opening 222, and on operation of the motor the rotation of the fan will draw air in through the opening 222 and force the same downwardly over the heating coil 203. A guide flange 229 is carried by each closure 212 and surrounds the fan 228, said flange serving to prevent lateral movement of the air body away from the fan, and to direct the discharge of the air directly onto the heating coil.

The bottom plate 230 is connected to the lower edges of the casing or shell 200, and connected to said bottom plate is a pair of flanged caps 231, one for each of the chambers formed at the interior of the casing or shell. Each of these caps 231 has an opening formed therein in line with the inner shells 209, and hingedly connected to one edge of each of these openings, as at 232, is a deflector plate 233 having side wings 234 at its edges that project upwardly into the openings of the caps. Each of the wings 234 is provided with an outwardly extending limiting stop 235 for controlling the extent of outward movement of the deflector plates 233.

Figure 11:
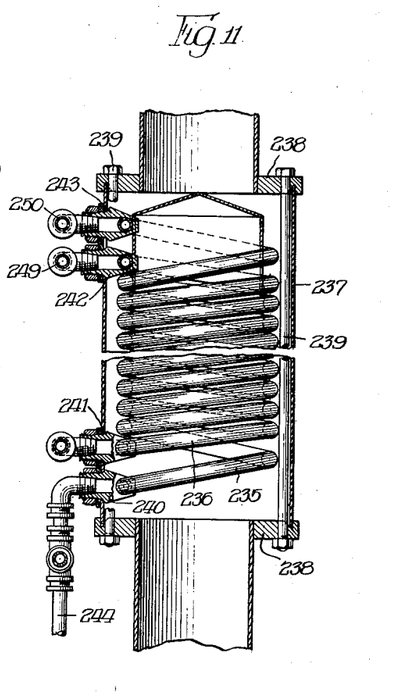
Fig. 11 is a vertical transverse sectional view of the steam generator employed with the form of the invention illustrated in Fig. 7, the line of section being indicated as 11—11, Fig. 7.

In Fig. 11 is disclosed the steam generator employed with the heater illustrated in Figs. 8, 9 and 10. To provide for equal efficiency of each of the heating units it is essential that the steam supply for the heating coil of each unit should be from a source separate and distinct from the supply of the other unit. To this end a plurality of generating coils 235 and 236 is employed. The convolutions of these coils are nested alternately with respect to each other, and are enclosed by a shell 237 closed at its ends by heads 238, which heads are connected by tie-bolts 239. The inlet ends of the coils 235 and 236 are provided with connecting nipples 240 and 241 respectively, while their outlet ends are likewise provided with connecting nipples 242 and 243 respectively. To the inlet nipple 240 is connected a feed-water pipe 244, said pipe leading from the feed pump 245, similar to the pump 28 of the form of the invention shown in Figs. 1 to 6 inclusive. The inlet end of the pump 245 has a feed pipe 246 in communication therewith, said pipe leading from a source of water supply (not shown) such as the feed tank 32, or it may be connected to the water jacket of the automobile motor. A T 247 is included in the feed-water pipe 244 and has connected thereto a branch feed-water pipe 248 which extends to and is connected with the inlet nipple 241. Thus the generating coils 235 and 236 are fed simultaneously with water from the pump 245 when the latter is in operation.

That the steam generated in the coils 235 and 236 may be conveyed to the heating coils 203 a feed pipe 249 is connected to the outlet nipple 242 and leads to one of the inlet nipples 205 of one of the units of the heater. A similar feed pipe 250 is connected to the outlet nipple 243 and extends therefrom to the inlet nipple 205 of the other unit of the heater. Hence, the generating coils 235 and 236 supply the respective heating coils of the units of the heater with the necessary steam, each heating coil being thus supplied by a generating coil separate and distinct from the other generating coil that constitutes the supply of the other heating coil.

Connected to the outlet nipples 207 to which the exhaust ends of the heating coils 203 are connected are discharge pipes 251 and 252 through which the water of condensation, or such steam as may remain uncondensed when discharged from the coils 203, is conveyed to an exhaust pipe 253, the two pipes 251 and 252 being merged into said exhaust pipe 253 by a T connection 254. The pipe 253 communicates with a pump 255, which may be operated from some suitable moving part of the automobile motor, and said pump returns the water of condensation to the water supply with which the pipe 246 is connected.

In the use of the form of the invention illustrated in Figs. 7 to 11, inclusive, the operation of the pump 245 draws water from the supply to which the pipe 246 is connected, said pump forcing the water through the pipe 244 and its branch 248 to the generating coils 235 and 236. Here the water is vaporized into steam the pressure thereof forcing the steam through the pipes 249 and 250 to the heating coils 203 of the units of the heater. The fans 228 of the heater having been set in operation air is drawn through the openings 222 and forced downwardly over the coils 203 by means of which the temperature of the air is raised, and the heated air emerges through the openings at the bottom of the heater casing 200 and is deflected by the plates 233 at the desired angle into the space to be heated. Water of condensation, or uncondensed steam which remains after passing through the coils 203, passes through the pipes 251 and 252 to the pipe 253, entering the pump 255, and being returned by the latter to the source to which the pipe 246 is connected, and this cycle of operations continues so long as the pumps 245 and 255 remain in operation and the generating coils 235 and 236 are sufficiently heated to generate the steam from the water pumped therein.

The present invention is not concerned with the specific form or structure of the pump-operating motors utilized with the pumps 28, 245 and 255, any desired form of which may be used. Those which have been shown and generally described are similar to those employed at the present time in standard forms of windshield wipers for automobiles and operated by the suction at the intake manifold of the automobile motor. Obviously, these motors are suitably controlled so that they may be caused to operate at the required times, and by reason of this, when it is not desired to utilize the hereindescribed heater, the controlling mechanism for the pump motors will not be actuated. No water, therefore, will be passed to the generating coils of the heater, so that no steam will be generated, and the coils 58 and 203 will receive no steam. As soon, however, as the pump of either form is set into operation water passes forthwith to the generating coils and is flashed into steam, the pressure in the coils forcing the steam to the heating element and enabling the air passing therethrough under the action of the fans to be raised in temperature.

Due to the intense heat of the exhaust gases passing from the automobile motor the steam generating coils are heated very rapidly, so that they become of the required temperature within a short time after the motor is set in operation to generate the steam necessary for feeding the heating coils of the heater. Obviously, therefore, the heater itself becomes available for use much more quickly than where the body of the cooling water of the automobile motor first is raised in temperature before the same can impart heat to the heat distributor in the space that is to be warmed, as is characteristic of that type of heater employing the water of the cooling system of the automobile motor as the source of its heat.

The shells 66 and 209 serve to concentrate the air, under the action of the fans 68 and 228, upon the heating coils 58 and 203, these shells cooperating with the shells 35 and 200 to provide channels in which the convolutions of the heating coils are located. By reason of this diffusion of the air is prevented and the heating of the same by the coils is attained to a maximum degree.

Due to the interlocking engagement of the cap 40 with the shell 35 of the heater disclosed in Figs. 1 to 6 by the indentations 42 with the groove 41 the cap 40 may be rotated with reference to the shell 35. This will permit angular adjustment of the cap 40 so that the air passing out at the deflector 43 may be discharged in various directions within the space to be warmed.

We claim:

1. In a heater of the class described, the combination with a steam generator associated with the exhaust of an explosive motor to utilize the exhaust gases thereof for generating the steam therein, of a heat distributing element located in the space to be heated, means for conveying steam from said generator to said heating element, pulsating means for feeding water to said generator, a feed-water supply to which said feeding means is connected and from which the water is fed to the generator in accordance with the pulsations of the feeding means, and means for returning water of condensation from the heating element to said feed-water supply.

2. In a heater of the class described, the combination with a steam generator associated with the exhaust of an explosive motor to utilize the exhaust gases thereof for generating the steam therein, of a heat distributing element located in the space to be heated, means for conveying steam from said generator to said heating element, a feed-water supply, pulsating means connected to said feed-water supply and responsive to the operation of the explosive motor for feeding water to said generator, and means for returning water of condensation from the heating element to said feed-water supply.

3. In a heater of the class described, the combination with a steam generator associated with the exhaust of an explosive motor to utilize the exhaust gases thereof for generating the steam therein, of a heat distributing element located in the space to be heated, means for conveying steam from said generator to said heating element, a feed-water supply, connections between said feed-water supply and said steam generator for feeding water to said generator, a pulsating pump included in said connections responsive to the operation of the explosive motor, and means for returning water of condensation from the heating element to said feed-water supply.

4. In a heater of the class described, the combination with a steam generating coil associated with the exhaust of an explosive motor to utilize the exhaust gases thereof for generating the steam therein, of a heat distributing element located in the space to be heated, means for conveying steam from said generating coil to said heating element, pulsating means for feeding water to said generating coil, a feed-water supply to which said feeding means is connected and from which the water is fed to the generator in accordance with the pulsations of the feeding means, and means for returning water of condensation from the heating element to said feed-water supply.

5. In a heater of the class described, the combination with a steam generating coil located in the path of the exhaust gases of an explosive motor to utilize said gases for generating the steam in said coil, of a heat distributing element located in the space to be heated, means for conveying steam from said generating coil to said heating element, pulsating means for feeding water to said generating coil and from which the water is fed to the generator in accordance with the pulsations of the feeding means, a feed-water supply to which said feeding means is connected, and means for returning water of condensation from the heating element to said feed-water supply.

6. In a heater of the class described, the combination with a steam generating coil arranged in the exhaust pipe of an explosive motor to utilize the exhaust gases passing through said pipe for generating the steam in said coil, of a heat distributing element located in the space to be heated, means for conveying steam from said generating coil to said heating element, pulsating means for feeding water to said generating coil, a feed-water supply to which said feeding means is connected and from which the water is fed to the generator in accordance with the pulsations of the feeding means, and means for returning water of condensation from the heating element to said feed-water supply.

7. In a heater of the class described, the combination with a steam generator including a spirally-formed pipe the convolutions of which are associated with the exhaust of an explosive motor to utilize the exhaust gases thereof for generating the steam therein, of a heat distributing element located in the space to be heated, means for conveying steam from said generator to said heating element, pulsating means for feeding water to said generator, a feed-water supply to which said feeding means is connected and from which the water is fed to the generator in accordance with the pulsations of the feeding means, and means for returning water of condensation from the heating element to said feed-water supply.

8. In a heater of the class described, the combination with a steam generating coil including a series of spirally-arranged convolutions located in the exhaust pipe of an explosive motor to utilize the exhaust gases passing through said pipe for generating the steam in said coil, of a heat distributing element located in the space to be heated, means for conveying steam from said coil to said heating element, pulsating means for feeding water to said generator, a feed-water supply to which said feeding means is connected and from which the water is fed to the generator in accordance with the pulsations of the feeding means, and means for returning water of condensation from the heating element to said feed-water supply.

9. In a heater of the class described, the combination with a steam generator associated with the exhaust of an explosive motor to utilize the exhaust gases thereof for generating the steam therein, of a heat distributing element located in the space to be heated and including a heating coil, a casing surrounding the same, and means for circulating air through said casing and over said coil to be heated by the latter, means for conveying steam from said generator to said heating element, pulsating means for feeding water to said generator, a feed-water supply to which said feeding means is connected and from which the water is fed to the generator in accordance with the pulsations of the feeding means, and means for returning water of condensation from the heating element to said feed-water supply.

10. In a heater of the class described, the combination with a steam generator associated with the exhaust of an explosive motor to utilize the exhaust gases thereof for generating the steam therein, of a heat distributing element located in the space to be heated and including a spirally-wound heating coil, a casing surrounding the same, and means for circulating air through said casing and over said coil to be heated by the latter, means for conveying steam from said generator to said coil, pulsating means for feeding water to said generator, a feed-water supply to which said feeding means is connected and from which the water is fed to the generator in accordance with the pulsations of the feeding means, and means for returning water of condensation from the heating element to said feed-water supply.

11. In a heater of the class described, the combination with a steam generator associated with the exhaust of an explosive motor to utilize the exhaust gases thereof for generating the steam therein, of a heat distributing element located in the space to be heated and including a spirally-wound heating coil, a casing surrounding the same, means for circulating air through said casing and over said coil to be heated by the latter, and means associated with said casing for controlling the discharge of the heated air from the casing, means for conveying steam from said generator to said coil, pulsating means for feeding water to said generator, a feed-water supply to which said feeding means is connected and from which the water is fed to the generator in accordance with the pulsations of the feeding means, and means for returning water of condensation from the heating element to said feed-water supply.

12. In a heater of the class described, the combination with a steam generator associated with the exhaust of an explosive motor to utilize the exhaust gases thereof for generating the steam therein, of a heat distributing element located in the space to be heated and including a spirally-wound heating coil, a casing surrounding the same, means for circulating air through said casing and over said coil to be heated by the latter, and means associated with said casing for deflecting the discharge of the heated air from the casing to direct the same at varying angles to the casing, means for conveying steam from said generator to said coil, pulsating means for feeding water to said generator, a feed-water supply to which said feeding means is connected and from which the water is fed to the generator in accordance with the pulsations of the feeding means, and means for returning water of condensation from the heating element to said feed-water supply.

13. In a heater of the class described, the combination with a steam generator associated with the exhaust of an explosive motor to utilize the exhaust gases thereof for generating the steam therein, of a heat distributing element located in the space to be heated and including a spirally-wound heating coil, a casing surrounding the same, means at one end of said casing for introducing air thereto and circulating the air through said casing and over said coil to be heated by the latter, and means at the opposite end of said casing for deflecting the discharge of the heated air from the casing to direct the same at varying angles to the casing, means for conveying steam from said generator to said coil, pulsating means for feeding water to said generator, a feed-water supply to which said feeding means is connected and from which the water is fed to the generator in accordance with the pulsations of the feeding means, and means for returning water of condensation from the heating element to said feed-water supply.

14. In a heater of the class described, the combination with a steam generator associated with the exhaust of an explosive motor to utilize the exhaust gases thereof for generating the steam therein, of a heat distributing element located in the space to be heated and including a spirally-wound heating coil, a casing surrounding the same, a fan at one end of said casing for introducing air thereto and circulating the air through said casing and over said coil to be heated by the latter, means for driving said fan, and means at the opposite end of said casing for deflecting the discharge of the heated air from the casing to direct the same at varying angles to the casing, means for conveying steam from said generator to said coil, means for feeding water to said generator, a feed-water supply to which said feeding means is connected, and means for returning water of condensation from the heating element to said feed-water supply.

15. In a heater of the class described, the combination with a steam generator associated with the exhaust of an explosive motor to utilize the exhaust gases thereof for generating the steam therein, of a heat distributing element located in the space to be heated and including a spirally-wound heating coil, a casing surrounding the same, a fan at one end of said casing for introducing air thereto and circulating the air through said casing and over said coil to be heated by the latter, means for driving said fan, and a hinged deflector at the end of the casing opposite to that at which said fan is located and serving to direct the discharge of the heated air at varying angles to the casing, means for conveying steam from said generator to said coil, means for feeding water to said generator, a feed-water supply to which said feeding means is connected, and means for returning water of condensation from the heating element to said feed-water supply.

16. In a heater of the class described, the combination with a steam generator associated with the exhaust of an explosive motor to utilize the exhaust gases thereof for generating the steam therein, of a heat distributing element located in the space to be heated, means for conveying steam from said generator to said heating element, a feed-water supply, connections between said feed-water supply and said steam generator for feeding water to said generator, a pump arranged in said connections and including a barrel provided with a water chamber, inlet and outlet valves controlling the flow of water to and from said chamber, and means for inducing flow of the water to and from said chamber, and means for returning water of condensation from the heating element to said feed-water supply.

17. In a heater of the class described, the combination with a steam generator associated with the exhaust of an explosive motor to utilize the exhaust gases thereof for generating the steam therein, of a heat distributing element located in the space to be heated, means for conveying steam from said generator to said heating element, a feed-water supply, connections between said feed-water supply and said steam generator for feeding water to said steam generator, a pump arranged in said connections and including a barrel provided with a water chamber, inlet and outlet valves controlling the flow of water to and from said chamber, a laterally disposed piston acting to induce flow of the water to and from said chamber, and means for returning water of condensation from the heating element to said feed-water supply.

18. In a heater of the class described, the combination with a steam generator associated with the exhaust of an explosive motor to utilize the exhaust gases thereof for generating the steam therein, of a heat distributing element located in the space to be heated, means for conveying steam from said generator to said heating element, a feed-water supply, connections between said feed-water supply and said steam generator for feeding water to said steam generator, a pump arranged in said connections and including a barrel provided with a water chamber, inlet and outlet valves controlling the flow of water to and from said chamber, a laterally-disposed cylinder carried by said barrel and communicating with said water chamber, a reciprocatory piston arranged in said cylinder and acting to induce flow of the water to and from said chamber, and means for actuating said piston, and means for returning water of condensation from the heating element to said feed-water supply.

WILLIAM KARSEL.
CHARLES W. TAYLOR.